United States Patent [19]

Metcalfe et al.

[11] 4,150,279
[45] Apr. 17, 1979

[54] RING ROLLING METHODS AND APPARATUS

[75] Inventors: Arthur G. Metcalfe, San Diego; Fred K. Rose, Bonita, both of Calif.

[73] Assignee: International Harvester Company, Chicago, Ill.

[21] Appl. No.: 723,623

[22] Filed: Sep. 14, 1976

Related U.S. Application Data

[60] Continuation-in-part of Ser. No. 553,998, Feb. 28, 1975, Pat. No. 3,988,913, which is a division of Ser. No. 484,307, Jun. 28, 1974, Pat. No. 3,944,782, which is a continuation-in-part of Ser. No. 426,564, Dec. 20, 1973, abandoned and Ser. No. 227,683, Feb. 18, 1972, Pat. No. 3,823,299, said Ser. No. 426,564 is a continuation of Ser. No. 226,570, Feb. 16, 1972, abandoned, said Ser. No. 227,683, and said Ser. No. 226,570 is a division of Ser. No. 856,526, Sept. 8, 1969, Pat. No. 3,644,698.

[51] Int. Cl.² .................... B21B 27/10; B21D 37/16; B21H 1/06

[52] U.S. Cl. ........................ 219/152; 72/69; 72/202; 219/119; 219/83; 219/118

[58] Field of Search ............. 219/83, 117 R, 118, 219/119, 152, 153, 162, 81, 117.1; 72/69, 200, 202, 342, 364, 250, 251

[56] References Cited

U.S. PATENT DOCUMENTS

| | | | |
|---|---|---|---|
| 2,813,194 | 11/1957 | Stermon | 219/152 |
| 3,095,500 | 6/1963 | Jost | 219/83 X |
| 3,459,915 | 8/1969 | Swazy et al. | 219/119 |
| 3,654,422 | 4/1972 | Erlandson | 219/81 |
| 3,780,259 | 12/1973 | Meyes | 219/119 |

FOREIGN PATENT DOCUMENTS

| | | | |
|---|---|---|---|
| 283161 | 5/1968 | U.S.S.R. | 72/200 |

Primary Examiner—J. V. Truhe
Assistant Examiner—Mark Paschall
Attorney, Agent, or Firm—Strauch, Nolan, Neale, Nies & Kurz

[57] ABSTRACT

Methods of forming metallic workpieces into ring-shaped components of selected cross-sectional configuration in which roll electrodes both heat the workpiece by electrical resistance and provide the pressure so that the workpiece becomes plastic and flows into the wanted configuration. Apparatus in which the method can be carried out, and tooling for controlling the configuration into which the workpiece is formed.

20 Claims, 14 Drawing Figures

RING ROLLING METHODS AND APPARATUS

This application is a continuation-in-part of application Ser. No. 553,998 filed Feb. 28, 1975 (now U.S. Pat. No. 3,988,913). Application Ser. No. 553,998 is a division of application Ser. No. 484,307 filed June 28, 1974 (now U.S. Pat. No. 3,944,782). The latter is a continuation-in-part of applications Ser. Nos. 426,564 filed Dec. 20, 1973 (now abandoned), and Ser. No. 227,683 filed Feb. 18, 1972 (now U.S. Pat. No. 3,823,299). Application Ser. No. 426,564 is a continuation of application Ser. No. 226,570 filed Feb. 16, 1972 (now abandoned). Applications Ser. Nos. 227,683 and 226,570 are divisions of application Ser. No. 856,526 filed Sept. 8, 1969 (now U.S. Pat. No. 3,644,698). The foregoing applications are hereby incorporated by reference herein.

The present invention relates to the shaping of metals and, more particularly, to novel, improved methods and apparatus for forming ring-shaped blanks into components of selected cross-sectional configurations.

Aerospace and other applications use a variety of ring-shaped components, many of which must be fabricated to close tolerances and in thin sections from metals and alloys that are difficult and expensive to shape. Among these are the superalloys, certain steels, and titanium and its alloys.

The foregoing and other requirements, such as freedom from surface contamination and cracking, make it impractical to fabricate such components by conventional cold or hot metal forming techniques.

Accordingly, while several processes have heretofore been developed for making such components, they all have the disadvantage that machining of the component from a heavy section is involved.

Machining is a relatively expensive metal forming technique, and energy consumption is high. Also, machining converts the excess material present in the initial workpiece from a relatively expensive form to scrap of very low value. This is especially important because as much as 90 percent of the workpiece may be converted to scrap and, again, wasteful because large amounts of energy are typically required to make the workpiece material. Titanium blanks, for example, may have an energy content as high as 50 KWH per pound.

We have now discovered that the disadvantages of conventional processes for fabricating rings can be minimized and other important benefits obtained by adapting to the manufacture of ring-shaped components the novel isothermal metal forming apparatus and techniques disclosed in our earlier filed applications identified above.

In our novel processes for making ring-shaped components a circular blank or workpiece is fed between a rotatable, forming electrode preferably made of refractory metal (i.e., a metal or alloy having a melting point above the range of iron, cobalt, and nickel) and a workpiece support which is typically a second electrode. As the workpiece passes between the electrodes, electrical current is passed from the forming electrode through the workpiece to the workpiece support, and the forming electrode is biased against the workpiece with a force of selected and controlled magnitude. This results in the workpiece material becoming plastic for a short period of time in a localized zone between the forming electrode and workpiece support and flowing into the cross-sectional configuration wanted in the final component.

At the same time that peripheral region of the forming electrode in contact with the workpiece tends to reach the same incandescent temperatures as the workpiece. Accordingly, an isothermal condition between the electrode and the workpiece is approached; and the workpiece remains hot enough until forming is completed that heat does not flow into the forming tool at a high enough rate to significantly reduce the temperature of the workpiece.

Workpieces can be formed to very close tolerances by employing the novel forming technique just described; and that technique is substantially less expensive than machining and requires significantly less energy. Accordingly, machining operations are reduced to a minimum or even eliminated, producing a substantial reduction in fabrication costs and an equally important energy savings.

At the same time material costs are substantially reduced because the conversion of expensive metal into scrap is reduced or, again, virtually eliminated. One analysis already conducted involved the use of a blank weighing ten pounds to produce a ring weighing one pound by heretofore available techniques. We found that, by employing the techniques of the present invention, the workpiece weight can be reduced to as little as 1.5 pounds.

In addition, a second reduction in energy waste is obtained because the amount of high energy-containing material needed is lower.

Another important advantage of our process is that surface contamination from scaling and alpha case typical with titanium alloys is not a problem. This is because preheating is in general not required and because the workpiece is at a high temperature for only a very short period of time during the forming operation.

Because the workpiece is heated for only short periods of time (measured in seconds) and because large amounts of deformation are generally involved (90 percent or more per pass) the grain size of the workpiece metal does not increase during applicants' forming process and, in many cases, is actually reduced. The result is that changes in the microstructure of the workpiece material produced during the forming process are beneficial, the final component typically having the fine grain and high tensile strength of sheet stock rather than the coarse grain and lower strength of heavy sections.

Furthermore, because the temperature in the zone where forming takes place can be accurately controlled, shaping in a selected temperature range to produce a controlled metallurgical structure is entirely practical. For example, shaping of Ti-6Al-4V can be carried out in the low or normal alpha-beta fields, in the beta field, or in the beta continuous field without difficulty.

Because the workpiece is not chilled during the forming operation, extremely thin sections (<0.005 inch) can be produced in even hard-to-work materials. This is important because of the requirement for components in thin gauges, particularly in turbine engines and other applications where weight and bulk are significant factors.

Another important advantage of our novel process for forming ring-shaped components is that forming conditions can be so controlled that the material in only part of the cross-section becomes plastic. In the remainder of the section the workpiece material remains relatively cool and retains its resistance to deformation and its load-bearing capacity. The cooler part of the section therefore functions as integral tooling, affording accurate control over the dimensions of the final component, particularly the peripheral length of a ring component.

Dimensional control can also be obtained by force feeding the workpiece; i.e., by exerting on the workpiece ahead of the forming electrode a force acting in the direction of workpiece movement. By using force feed, elongation of the workpiece can be eliminated or reproducibly increased during the forming operation or the workpiece can actually be shortened, if desired.

Aside from their other disadvantages, conventional hot working processes would not afford diametral control if employed for applicants' purposes because, in the preheating step, the entire section of the workpiece is heated to forming temperature. Therefore, there is no part of the section in which the workpiece material is sufficiently cool and resistant to deformation to afford dimensional control.

Force feeding as described above also has the advantage that, by employing it, increased per pass reductions of the workpiece material (from 50 to 70 to over 90 percent) can be obtained. This has the obvious advantage of reducing the number of passes required to attain a specified configuration. Also, massive deformation produces a reduction in grain size and a concomitant increase in physical properties.

Still another important advantage of our novel process is that such post-forming treatment of the component as may be required can be easily and inexpensively carried out. Sizing, final setting of the angles between the legs of flanged components, and rounding of the component can be readily accomplished by hot sizing or even by cold expanding in some cases because dimensional control within as little as 0.01 percent of nominal dimensions can be obtained in the forming process. Edge trimming can be accomplished and faces and diameters brought within close tolerances with a minimum of machining because of this same control over dimensional tolerances in the forming step.

A minimum of surface clean-up will be needed in most cases. This can be accomplished by pickling or bead blasting, for example.

Typically, the workpiece employed in fabricating components in accord with the principles of the present invention will be made by cold rolling or bending standard sheet, plate or barstock into a circular blank and fusion welding the ends of the blank together. Another important advantage of our invention is that the weld is worked as the workpiece is formed, producing a joint having a quality approaching if not equaling that of the parent material.

Still other advantages of the present invention will be apparent to those skilled in the relevant arts from parent application no. 553,998.

Those skilled in the relevant arts will also appreciate that the isothermal forming of ring-shaped components as disclosed herein is distinctly different from the special hot rolling techniques described in U. S. Pat. Nos. 2,813,194 issued Nov. 12, 1957, to R. B. Stermon for UPSETTING MACHINE and 3,250,104 issued May 10, 1966, to Fischer for HIGH-TEMPERATURE ROLLING MILL as well as different from commercially employed hot working processes.

The art recognizes that the Stermon process is not useful for forming harder, more difficult-to-work materials, circumstances in which our novel process can be employed to particular advantage. In U. S. Pat. No. 2,922,014 issued Jan. 19, 1960, to V. W. Green for *HIGH FREQUENCY INDUCTION HEATING AND ROLL FORGING OF METAL WORKPIECES*, the patentee discusses several disadvantages of the Stermon process and points out that it is not of value where hard-to-work metals are involved.

The reasons that the Stermon process cannot be used to form hard-to-work metals are manifest from an inspection of the forging apparatus disclosed in his patent. Heat is extracted from the workpiece by the forging rolls, reducing its temperature; and the workpiece becomes too hard to be shaped as a consequence.

The Stermon process is also unusable to shape hard metals and alloys because, as the edge of the workpiece is upset, metal flows into contact with upset limiting blocks and because the rest of the workpiece is unheated and, also, in thermal contact through electrical conductors with massive, unheated die blocks (materials having low ohmic resistance are good thermal conductors). The die blocks, conductors, and upset limiting blocks would chill the edtes of a hard, non-ductile metal workpiece to such an extent that it could not be satisfactorily shaped, even if it were not chilled to an unacceptable extent by the forming rolls.

Fischer's process involves preheating the workpiece to forming temperature and then shaping it with rolls heated by gas-fired or electric heaters adjacent the rolls. The Fischer process therefore has the same drawbacks as any other process employing preheating of the workpiece.

From the foregoing it will be apparent to the reader that one important object of the present invention resides in the provision of novel, improved methods of and apparatus for fabricating ring-shaped components of metallic materials.

Another important but more specific object of our invention resides in the provision of methods and apparatus for fabricating ring-shaped components which, in comparison to heretofore available techniques for making such components: provide substantial cost reductions and energy savings; make it possible to produce components of higher quality; and minimize the number and cost of post-forming operations.

Other important objects and features and additional advantages of our invention will become apparent from the appended claims and as the ensuing detailed description and discussion proceeds in conjunction with the accompanying drawing in which:

Figure 1:
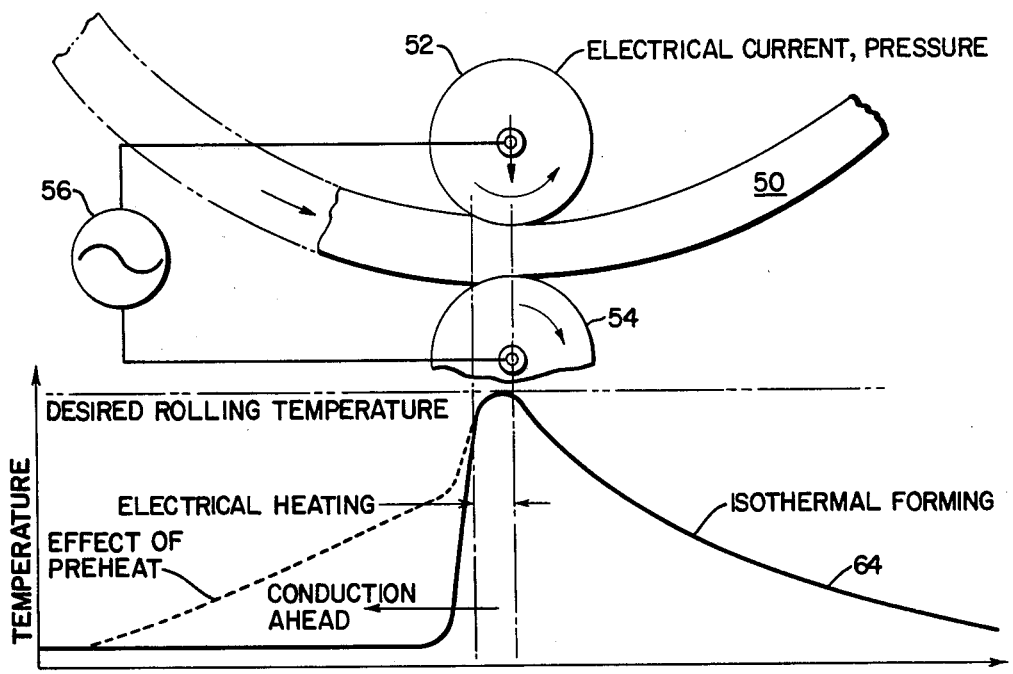
FIG. 1 is a diagrammatic illustration of a metallic workpiece being formed in accord with the principles of the present invention; the figure also shows the temperature distribution in the workpiece before, during, and after the forming step.

Referring now to FIG. 1 of the drawing, the novel metal forming processes disclosed herein and described briefly above involve the application of heat and pressure in a localized region of the workpiece 50 being formed. The pressure is applied by a rotatable electrode 52. Electrode 52 is biased toward a second, rotatable forming electrode 54 with controlled force to exert pressure of a selected magnitude on the workpiece (the pressure exerted on the workpiece by a forming tool is referred to herein as the "squeeze force").

As it passes forming electrodes 52 and 54, workpiece 50 is heated sufficiently high to make it plastic, the force exerted on the workpiece and the heat supplied to it being correlated to keep the workpiece material at the desired working temperature.

The heating is accomplished by connecting the two forming electrodes 52 and 54 to opposite sides of an electrical power source 56. The circuit between the two electrodes is completed through the workpiece.

One of the important criteria of the invention for most applications is that the forming electrodes be fabricated of a refractory metal. Molybdenum is satisfactory as are its alloys such as TZM and TZC. Tungsten, tantalum, and columbium and their alloys and other refractory metals and refractory alloys may also be employed with the choice being dictated by the requirements of a particular application, the costs of manufacturing the forming tool from different candidate materials, the service life of particular materials, etc.

The use of a refractory metal forming electrode and the particular method of heating the workpiece described above are important in our process. They permit the workpiece to be heated to temperatures sufficiently high that even the most difficult-to-work metals become plastic and can be readily formed because the refractory forming tools retain a high proportion of their strength at elevated temperatures.

Workpiece temperatures of 2500° F. are readily reachable in our process; and even higher forming temperatures can be employed, if desired. Molybdenum alloy forming tools are capable of being used at temperatures as high as 2500° F.; and tools of tungsten and its alloys, for example, can be used at still higher temperatures.

Another advantage of refractory metal forming tools flows from the fact that the material is not heat treated. Accordingly, when the tools become worn, they can be readily reshaped to extend their useful life.

Figure 2:
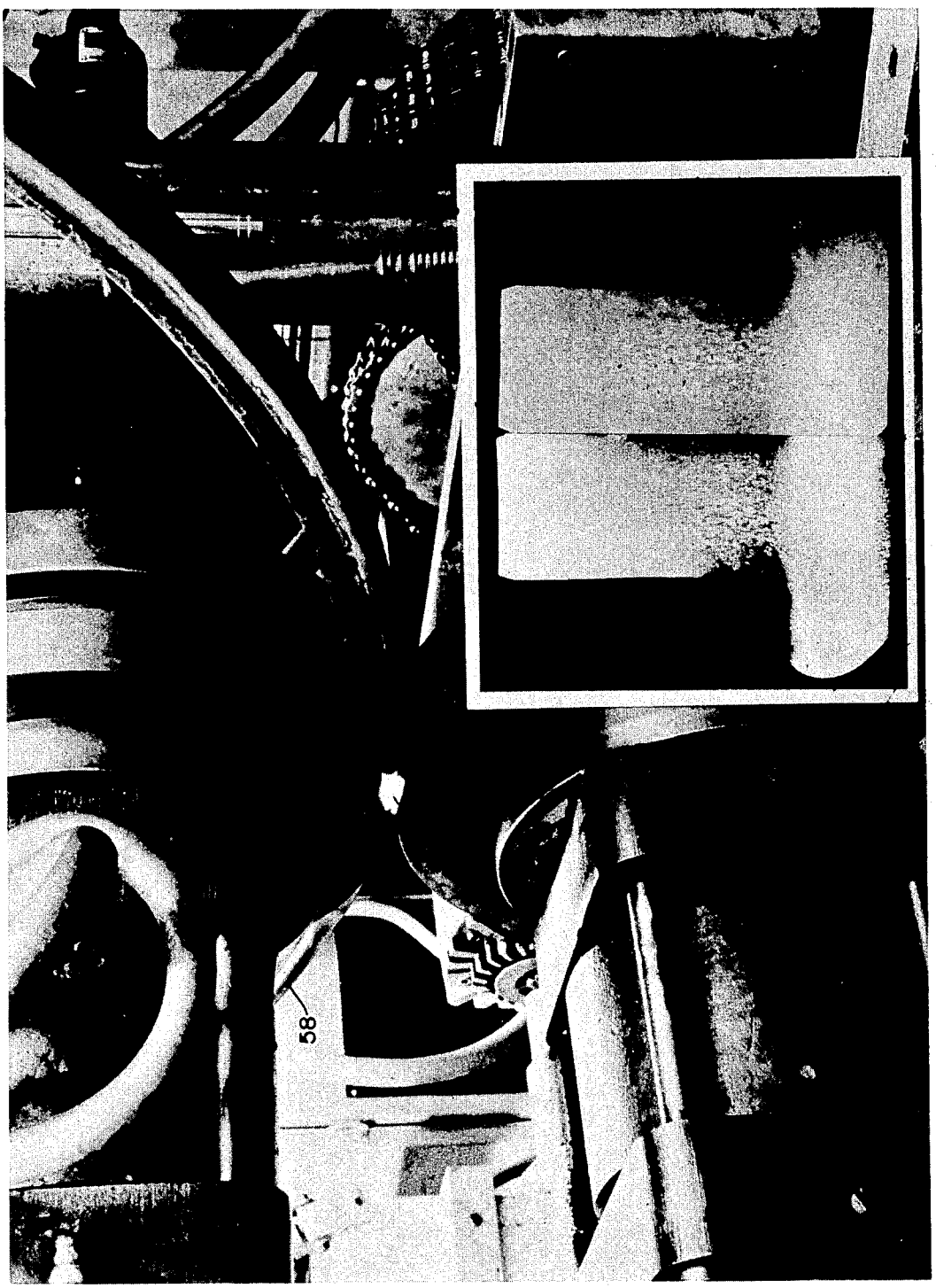
FIG. 2 is a photograph showing the temperature conditions in the forming tool and in the workpiece during forming in accord with the present invention; an inset contains photographs of sections through the components into which the workpiece was formed.

The temperature relationship between the workpiece and forming electrode is shown diagrammatically in FIG. 2 in which both a localized portion of a workpiece 58 being formed and a peripheral portion 60 of the forming electrode 62 are incandescent. Typically, this "hot spot" 60 will be on the order of one inch long and one-half inch deep.

This essentially isothermal relationship between the workpiece and the forming electrode means that the forming electrode can be heated to and kept at a temperature approaching that of the workpiece so that there is no appreciable flow of heat from the workpiece into the forming electrode; and the workpiece material remains plastic and flows rather than being chilled and becoming hard as it does when contacted by the forming tool in a conventional metal working process. Consequently, metals and alloys which it has heretofore been impractical to shape except by machining from heavy sections can be readily formed into thin gauges and a variety of cross-sectional configurations.

Also important in our process and shown in FIG. 2 and by curve 64 in FIG. 1 is that only a small, localized zone of the workpiece is at an elevated temperature and only for the short period of time that forming is actually taking place and a short period of time thereafter, the total time being measured in seconds. As a result, scaling, alpha case, and other forms of surface contamination are negligible if not entirely absent as are the other undesirable results of prolonged heating at high temperatures such as grain growth.

FIG. 2 additionally shows that the small incandescent portion of the forming electrode is backed by a large mass of metal which is at much lower temperatures. This contributes to the strength of the electrode during the forming process and, also, to the maintenance of a near isothermal relationship between the forming electrode and workpiece.

Not only do the forming electrode materials preferably employed in the present invention have high strength at elevated temperatures, but the strength differentials between these materials and hard metals and alloys such as titanium alloys and superalloys increase at higher temperatures. This is important because hard alloys such as Rene' 95 become sufficiently plastic to form only at temperatures within a few degrees of their solidus temperature.

As discussed previously, our process is unique in the massive per pass deformation of the workpiece we achieve. This is important for the obvious economic reason that increased reduction per pass through the forming electrodes reduces the number of passes required and also because of the refinement of grain structure and other beneficial changes in the microstructure of the workpiece which can be obtained by a high percentage of reduction or deformation.

The changes in the microstructure of the workpiece which can be achieved by forming it in accord with the principles of the present invention are important because they result in improved tensile properties as well as higher shear strength, fracture toughness, and endurance limit.

Typically, at least a 50 percent reduction will be obtained in a forming operation in accord with the principles of the present invention; and the amount of deformation may be raised to 90 percent or higher if force feed as described briefly above and in more detail hereinafter is employed.

The various parameters involved in forming metal by our novel processes will vary from application-to-application. To illustrate the values which these parameters may assume, however, in forming ring-shaped components in accord with the principles of the present invention we are able to employ currents of up to 25,000 amperes at voltages ranging up to 15 volts, forming forces of 45,000 pounds for rotatable forming electrodes between one and two inches wide, compressive or force feed forces ranging up to 12,000 pounds, and forming speeds of 7–10 inches per minute.

Higher rolling speeds mean less deformation per pass, typically requiring multiple passes to form the component. In ring rolling, this is not necessarily disadvantageous as irregularities in the gage or section of the workpiece at the beginning and end of the pass are more easily avoided if multiple passes and lower deformation rates are employed.

On the other hand, decreasing the forming speed typically results in increased flow of the workpiece material, reducing the number of passes required to form the component. From an economic point-of-view, lower speeds may in some applications therefore be referable. Lower speeds may in some instances also result in components of superior quality because of the lower strain rate and increased metal flow. In any event, even if lower forming speeds are employed, fabrication rates will still typically be higher than those which can be attained in processes involving extensive machining of heavy section workpieces.

Among the metals which can be successfully formed by our novel processes are 1018 mild steel, A70 titanium, beryllium, Ti-6 Al-4 V, Hastelloy X (Co 1.5, Cr 22, Mo 9.0, W 0.6, Fe 18.5, C 0.1, balance Ni), Inconel 713C (C 0.14, Cr 13.0, Mo 9.5, Ti 0.75, Al 6.0, Cb+Ta 2.3, balance Ni), Rene' 95 (Cr 14.0, Co 8.0, Mo 3.5, W 3.5, Cb 3.5, Ti 2.5, Al 3.5, balance Ni), Inconel 718 (C 0.04, Mn 0.20, Fe 18.0, Cr 14.0 Al 0.60, Ti 0.80, Cb 5.2, Mo 3.0, balance Ni), 17-4PH (C 0.07, Cr 16.5, Ni 4.0, Cu 4.0, Cb+Ta 0.30, balance Fe), Ti-6 Al-6V-2Sn, and T321 and 18-8 stainless steels.

The forming of ring-shaped components in accord with the principles of the present invention can be divided into two categories—radial rolling and face rolling.

In radial rolling the ring-shaped workpiece or blank is oriented with its axis of symmetry parallel to the axes of rotation of the forming electrodes. One (or both) of the electrodes are mounted for movement in a radial direction relative to their axes of rotation. They accordingly exert on the workpiece in this radial direction the squeeze force employed to form it to shape as the workpiece is translated relative to the electrodes.

In radial rolling the blank rotates about its axis of symmetry as it is moved between the electrodes. This movement can be effected by contrarotation of the electrodes. We have in one case furnished the electrodes with 50,000 inch-pounds of torque for this purpose.

In face rolling the workpiece and appropriate tooling are also translated between the electrodes by rotating the workpiece and tooling about its axis of symmetry. In this case, however, the axis of symmetry is oriented at right angles rather than parallel to the axes of rotation of the electrodes. The squeeze force is as a consequence exerted on one or more faces of the workpiece and in a direction parallel to the axis of symmetry rather than in a radial direction relative to the workpiece.

Figure 3:
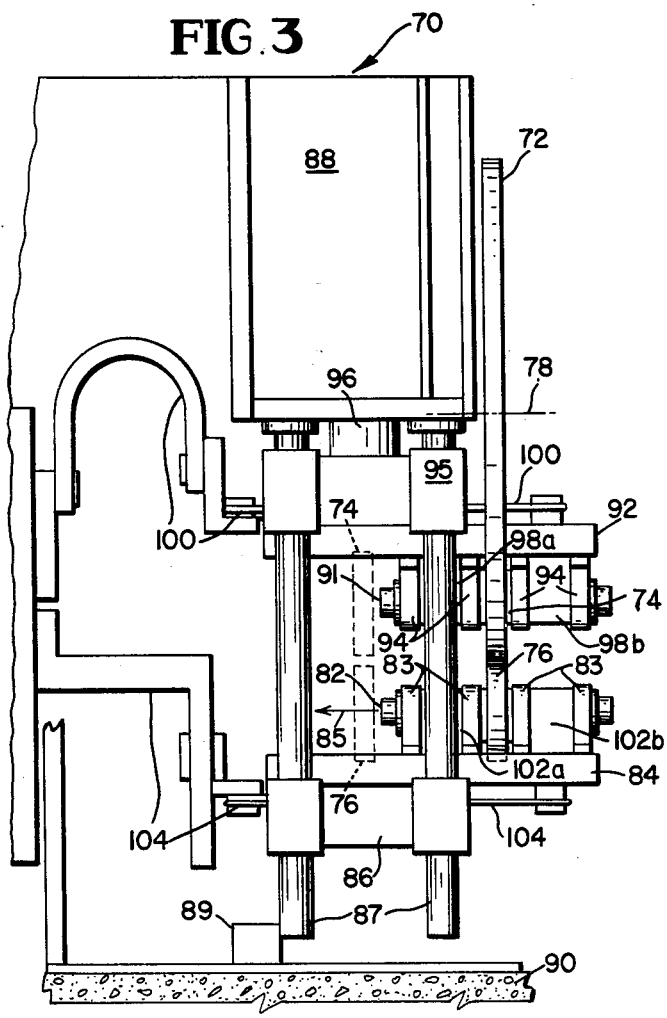
FIG. 3 is a generally diagrammatic side view of metal forming apparatus constructed in accord with and embodying the principles of the present invention.
Figure 4:
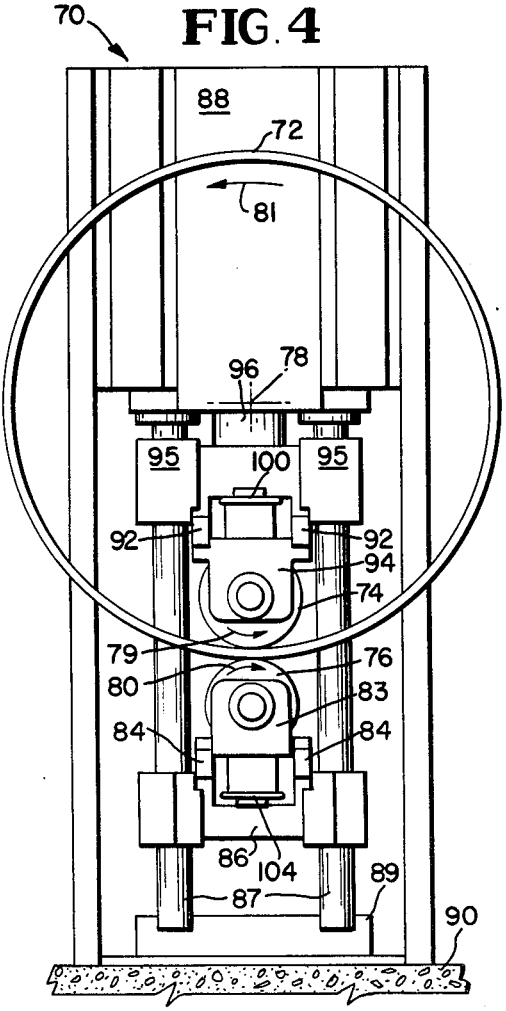
FIG. 4 is a front view of the apparatus of FIG. 3.

Referring again to the drawing, FIGS. 3 and 4 show diagrammatically, one form of apparatus 70 for forming metallic blanks or workpieces into ring-shaped components of selected cross sectional configuration by radial rolling of the workpiece in accord with the principles of the pesent invention. In apparatus 70, the workpiece 72 is oriented vertically and between upper and lower forming electrodes 74 and 76 as shown in FIG. 4. Forming is accomplished while effecting movement of the workpiece about its horizontal axis of symmetry 78 between and relative to upper and lower forming electrodes 74 and 76. The electrodes are also vertically oriented and rotated about horizontal axes. As discussed above and shown by arrows 79, 80 and 81 in FIG. 4, the wanted movement of the workpiece is accomplished by oppositely directed rotation of electrodes 74 and 76. The system for rotating the electrodes has not been shown as it may be identical to the drive system disclosed in our earlier applications such as Ser. No. 856,526.

The dimensions of the rotatable electrodes will of course depend upon the configuration and dimension of the workpiece and the configuration into which it is to be formed as well as the physical capabilities of the other machine components. In the machine shown in FIG. 3 and 4, the electrode/forming tools can be up to two inches wide and twelve inches in diameter. They are fabricated from TZM molybdenum alloy.

The lower forming electrode 76 is mounted on a lower drive shaft 82 supported in bearing module 83.

The assembly of electrode, shaft, and bearing modules is slidably mounted on a horizontally oriented, extension support rail 84. This permits the electrode to be displaced to the left as shown by arrow 85 in FIG. 3 to the dotted line position when carrying out forming operations such as those described in our earlier-filed applications or in forming small diameter rings or to the illustrated full line position to accommodate larger diameter rings.

Extension support rail 84 is fixed to a lower head 86 clamped to vertically extending structural columns 87. The columns are supported at their upper ends from the frame 88 of machine 70. A reaction block 89 fastened to foundatin 90 in abutting relationship with the two left-hand columns 87 (FIG. 2) stabilize the columns.

The upper forming electrode 74 is similarly mounted on an upper drive shaft 91 and rotatably supported from an upper extension support rail 92 by bearing modules 94. Rail 92 is fastened to an upper head slidably mounted for movement in a vertical direction on structural columns 87.

In the forming operation, a force of predetermined magnitude is exerted on that part of the workpiece being formed between the electrodes by biasing upper head 95 and, therefore, the upper forming electrode 74 toward the lower forming electrode 76. The force is exerted by a hydraulic ram 96.

That part of the workpiece between the electrodes is also heated as it passes therebetween. To accomplish this, the upper forming electrode 74 is connected to one side of an electrical power source (not shown) through inboard and outboard current collectors 98a and b and bus bars collectively identified by reference character 100. The lower forming electrode 76 is connected to the opposite side of the power source through inboard and outboard collectors 102a and b and bus bars collectively identified by reference character 104. The circuit is completed through the workpiece as discussed above, effective short-term self-resistance heating in a localized portion of the workpiece as shown in FIG. 1.

While not essential in all cases, the use of current collectors on both sides of each of the electrodes 74 and 76 is preferred. This promotes an even distribution of current across the electrodes.

Figure 5:
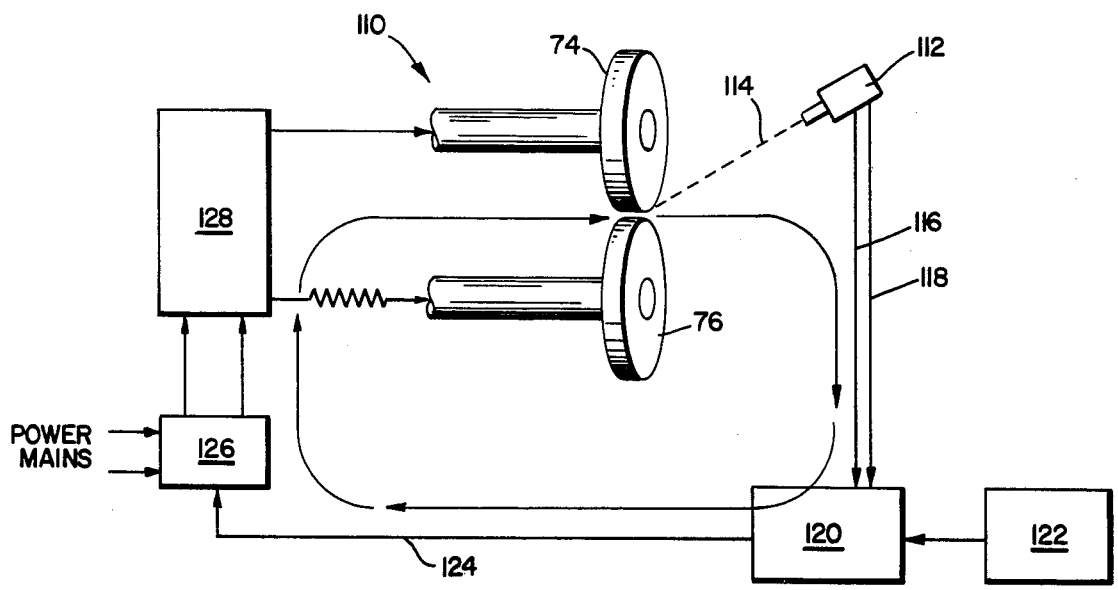
FIG. 5 is a schematic illustration of one form of control system which can be employed to control process conditions in apparatus of the character illustrated in FIGS. 3 and 4.

A further, and most important, aspect of the apparatus disclosed herein is a system for controlling the density of the current flowing from forming electrode 74 to forming electrode 76 through the workpiece being formed. One control system 110 which can be employed in such machines is shown in FIG. 5.

Control system 110 is of the forming temperature responsive, feedback type. Such control systems are preferred because this feedback control can hold thickness in the rolled section to ± 0.001 inch.

Also, because control is independent of the temperature the workpiece has when it reaches the forming electrodes, the preferred system makes it practical to preheat the workpiece prior to the forming step. Preheat can in may cases be used to advantage to increase forming speeds and to avoid damage to the forming electrode(s), for example.

As discussed in our earlier-filed applications and shown in FIG. 1, preheat as employed by us only involves heating the workpiece to a modest temperature for a short period of time, typically by using self-resistance heating as disclosed in copending application Ser. No. 607,788 Aug. 26, 1975 (now U.S. Pat. No. 3,988,914), for example. Consequently, surface contamination and other deleterious effects of conventional preheating—which typically involves soaking the workpiece in a pit for an extended period of time until it reaches the high, forming temperature—are avoided.

Referring again to FIG. 5, control system 110 includes a detector 112 which generates an electrical output signal indicative of the actual workpiece temperature. A comparison is made between the actual temperature as ascertained by the detector and the target temperature. If there is a deviation, an error signal is generated and employed to adjust the density of the current through the workpiece in the direction necessary to bring the workpiece temperature to the established level.

In the illustrated system the feedback signal generating detector is a radiation pyrometer sighted at a location just where contact is made between the forming electrodes and the workpiece being formed as indicated by line 114. The pyrometer is preferably one having a small target area such as an Ircon Model 300. Use of a pyrometer of this character avoids the necessity of employing elaborate electrical networks to remove unwanted electrical signal components.

The output signal from the pyrometer is conducted by inputs 116 and 118 to a process controller 120 where the signal is compared with a setpoint reading to identify deviations from the desired forming temperature. One suitable process controller for use with machines of the character shown in FIGS. 3 and 4 is the Research, Inc. "Thermal Model PC 5192". The setpoint is obtained manually or by a programmer 122 which may be, for example, a Research, Inc. "Data-Trak Model 411.01".

The process controller 120 is connected through output 124 to an SCR power controller 126 such as a Loyola LPAC-3-480-207. The power controller regulates the level at which the current flows to the workpiece from a conventional power supply 128. The power supply is connected to an AC power source and to the forming electrodes 74 and 76.

It is not essential that the detector be a radiation pyrometer. Other detectors or sensing devices which can be employed instead of the latter are illustrated and described in our earlier field application no. 426,564.

Such detectors are also capable of maintaining close tolerances. For example, a control system with a current responsive detector or senser as described in our earlier application is capable of maintaining the thickness of a rolled section to ± 0.002 inch.

Control over the squeeze force exerted on the workpiece by the forming electrodes is also important in ensuring satisfactory results; and machine 70 is, therefore, preferably provided with a system for controlling this parameter. This control system has not been shown because the details of the system are not considered essential to an understanding of the present invention or to its practice.

Briefly, however, this system is preferably of the closed loop, feedback type like the temperature control system. It will typically consist of one or more load cells so located as to respond to the force exerted on the workpiece and feedback circuits from the load cell or cells to an appropriate process controller for hydraulic ram 96.

One of the important features of the present invention in many applications of its principles is the use of integral tooling to support the workpiece as it is translated through the forming electrodes, eliminating the need for an external guidance system.

"Integral tooling" is a term we employ to identify the technique of heating the workpiece being formed over only a part of its cross section so that the remainder of the material in the section will be essentially cold and have a much higher strength. This results in what we term the "cold" part of the section having sufficient load bearing capacity to maintain accurate diametral control.

The principal factor affecting the load bearing capability of the integral tooling is the area ratio of the "hot" and cold parts of the section. For example, it can be shown by calculation for certain types of ring sections that diametral control within 0.2 percent of nominal can be maintained if the cold part is at least a certain percentage of the total cross section. Typical calculated values are: 27 percent for Inconel 718; 35 percent for 410 and A28 steels; and 40 percent for Hastelloy X, HS188, and Ti-6A1-4V.

The following table shows the high degree of diametral control obtained in actual practice by employing integral tooling to form ring-shaped components from representative metallic materials.

TABLE I

| Diametral Control of Rings Using Integral Tooling | | | |
|---|---|---|---|
| Hot Area | Diametral change (ΔD/D) | | |
| Cold Area | Mild Steel | Stainless Steel | Ti-6A1-4V |
| 0.485 | — | — | <0.00025 |
| 0.60 | <0.00025 | — | — |
| 0.91 | — | — | <0.0001 |
| 1.08 | 0.078 | — | — |
| 1.08 | 0.078 | — | — |
| 1.66 | — | 0.153 | — |
| 1.66 | — | 0.058 | — |
| 1.80 | — | 0.1.6 | 0.0021 |
| 1.80 | — | 0.134 | — |

Because increasing values of ΔD/D are positive, indicating that forming results in increased diameter, force feed can also be employed for diametral control. By "force feed" we mean the application to the workpiece ahead of the forming electrodes of a force acting in the direction of workpiece movement.

Figure 6:
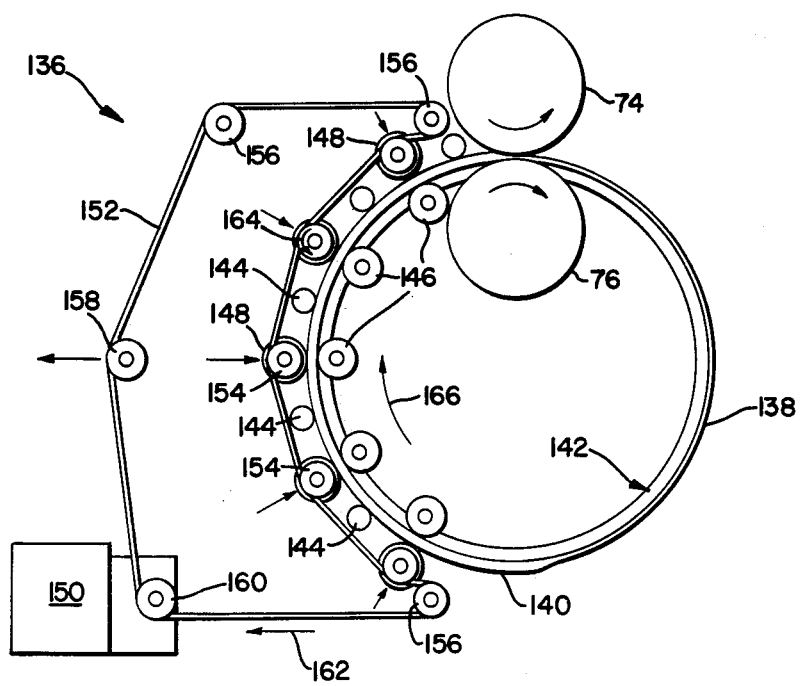
FIG. 6 is a generally diagrammatic side view of a force feeding unit for the forming apparatus of FIGS. 3 and 4.

One force feed device which may be employed with machines embodying the principles of the present invention such as isothermal forming machine 70 is illustrated in FIG. 6 and identified by reference character 136. In FIG. 6 machine 70 (only the forming electrodes are shown) is set up to spread into a flange 138 the shoulder 140 of a ring-shaped workpiece 142.

The force feeding device includes outer and inner workpiece support rolls 144 and 146, feed or drive rolls 148, and a motor 150 for driving feed rolls 148 through an endless belt 152.

Workpiece support rolls 144 and 146 are supported from the frame of the machine (not shown) on a separate framework and spaced along and on opposite sides of the path of workpiece movement to guide the workpiece and support it against the force exerted by drive rolls 148. Rolls 146 are mounted so they can be moved away from rolls 144 to remove and replace the workpiece, and inner rolls 146 are preferably shouldered to constrain the workpiece to the desired path.

Drive or feed rolls 148 are also supported from the machine frame or a separate framework, preferably through a hydraulic cylinder or the like so that they can be clamped into driving relationship against the workpiece. Clamping rolls of this character are described in more detail in parent application no. 553,998 (see FIGS. 8 and 9 and the associated text) to which the reader may refer, if desired.

The faces of the feed rolls may also be serrated, if desired, for better contact with the workpiece. Any indentations, etc. imparted to the workpiece by the serrations will be eliminated in the subsequent forming operation.

Endless belt 152 will typically be of the roller type. It is trained over drive sprockets 154, which rotate the feed rolls; fixed idlers 156; a movable tension idler 158; and motor drive sprocket 160. With motor 150 energized, belt 152 moves in the direction indicated by arrow 162 in FIG. 6, rotating drive rolls 148 in the direction indicated by arrow 164. This applies to the workpiece a compressive or feed force acting in the direction of arrow 166.

It was pointed out above that force feed as just described can be used to eliminate increases in the diameter of the workpiece being formed or, if higher values are employed, to actually effect a decrease in diameter. This is because force feed promotes lateral flow of the workpiece metal at the expense of workpiece elongation. Also, as indicated above, application of force feed can be employed to increase per pass reductions in the workpiece from a maximum of approximately 50–70 percent without force feed to well over 90 percent.

FIGS. 7A–7E illustrate representative radial rolling processes in accord with the principles of the present invention and the components made by those processes. Those forming techinuqes illustrated in FIGS. 7A–7C also make use of integral tooling while the last two require an external guidance system for diametral control because the entire cross-section of the workpiece is heated. The type of guidance system is not critical. For example, shouldered support rolls spaced along and on the inner side of the path of workpiece movement as shown in FIG. 6 may be employed.

All of the illustrated FIGS. 7A–7E techniques can be carried out with the machine 70 illustrated in FIGS. 3 and 4. For the processes shown in FIGS. 7A–C, however, the illustrated lower electrode 76 is replaced with a split electrode 168 composed of two refractory metal electrode members or segments 170 and 172 separated by an independent or integral shim 174 forming a gap which equals in width and accomodates a radially extending portion 175 of the workpiece being formed (176 in FIG. 7A). This confinement of the workpiece flange between the lower electrode members keeps the workpiece in the proper position relative to the electrode as it is displaced therebetween. In consequence of this and the use of integral tooling we have successfully rolled rings as much as 42 inches in diameter without using an external guidance system.

Figure 7A:
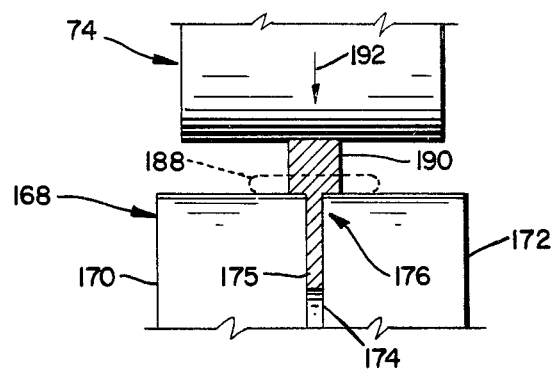
FIGS. 7A–7E depict exemplary radial rolling processes employing the principles of the present invention.
Figure 7B:
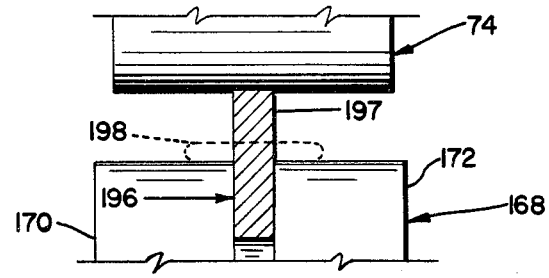
Figure 7C:
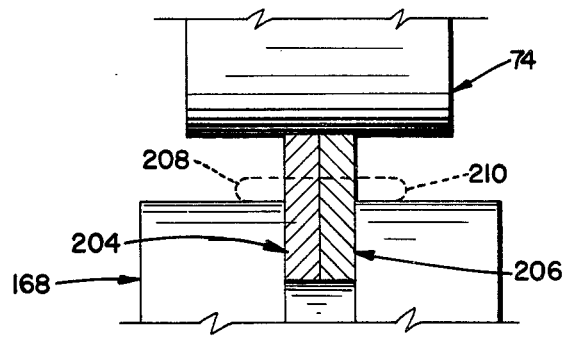
Figure 7D:
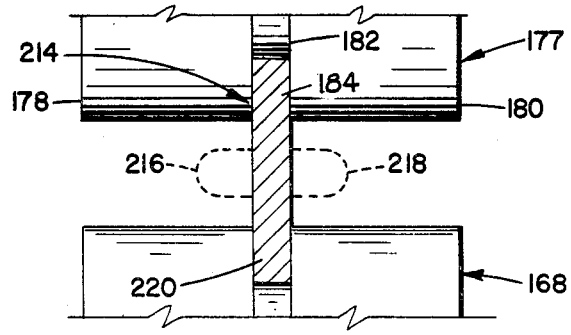

The technique illustrated in FIG. 7D requires that the upper electrode shown in FIGS. 3 and 4 also be replaced with a split electrode 177 in this case composed of electrode members 178 and 180 separated by a shim 182 to form a guide gap for a radially extending workpiece portion 184.

Figure 7E:
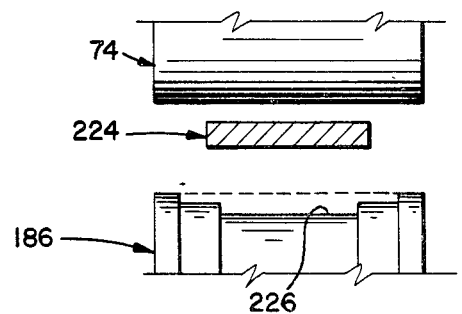

For the technique shown in FIG. 7E, the flat-faced upper electrode 74 is employed. However, the lower electrode 76 is replaced with an electrode 186 sculpted with the obverse of a configuration wanted in the component being formed.

Referring again to the drawing, FIG. 7A depicts the forming of a T-shaped ring having a longitudinally extending flange or leg 188 and a radially extending leg corresponding to the original radial leg 175 from shouldered blank 176 by laterally spreading an unsupported portion 190 of the workpiece as the latter is translated between electrodes 74 and 168.

In the method shown in FIG. 7A, current flows from electrode 74 through the unsupported portion 190 of the workpiece into electrode members 170 and 172 as the workpiece moves between the electrodes, locally heating portion 190 of the workpiece section to a plastic condition. Upper electrode 74, exerting a force in the direction indicated by arrow 192 on this portion 190 of the workpiece, flattens and spreads the workpiece material laterally into longitudinal leg 188.

Because electrode members 170 and 172 are at the same potential, current does not flow between them. The radial flange 175 of the workpiece between the two electrode members therefore remains unheated except by conduction which raises its temperature to only a few hundred degrees Fahrenheit. Flange 175 therefore remains dimensionally stable and retains its load-bearing capacity, making it capable of controlling a diametral dimensions of the formed component to within as little as 0.01 percent of nominal.

Translation of the workpiece is continued until it has been rotated through 360 degrees completing the formation of flange 188 around the periphery of the workpiece. To avoid irregularities, "tapering in" "tapering out" of the forming electrodes can be employed at the beginning and end of the pass. Such techniques are conventionally employed in circumferential fusion welding and can be used without significant modification in the processes described herein.

It will be readily apparent from FIG. 4 that the technique just described can be carried out with the workpiece encircling: (a) upper electrode 74 as shown; or (b) the lower, split electrode 168. If the first alternative is adopted, a "leg out" ring will be formed; i.e., a component with flange 188 surrounded by an outwardly extending, radial flange 175.

On the other hand, if the spreading operation is carried out with the workpiece encircling the lower electrode, a "leg in" ring (i.e., one with the radial leg extending inwardly from the flange) will be formed.

Shouldered blanks as shown in FIG. 7A can be fabricated from barstock at modest cost by employing isothermal metalworking as described above and in parent application No. 553,998 to shape the section in straight barstock and then bending the barstock into a ring and welding the ends together. Alternatively, mechanical techniques such as straddle milling or chemical milling (as described in the parent application, for example) can be used to form the section in the blank.

The process shown in FIG. 7B is like that just described except that the workpiece 196 has a rectangular or non-shouldered section. Such workpieces or blanks can be made from barstock or by cutting sheet or plate stock into strips; rolling the strips or barstock into rings typically in the "hard" dimension); and welding the ends of the strips together using electron beam welding, flash butt welding, TIG welding, or plasma arc welding, for example.

In the shaping process shown in FIG. 7B, it is again only the unsupported portion 197 of the workpiece which becomes heated to the extent that it becomes plastic and spreads into longitudinal leg 198. The radial portion of the workpiece, which is guided between lower electrode members 170 and 172 as the workpiece is translated relative to the forming electrodes, again reaches a temperature of only a few hundred degrees Fahrenheit, thereby retaining its stability and load bearing capability and functioning as integral tooling.

FIG. 7C is included to show that the workpiece may be composed of plural members, in this case two rings 204 and 206 of the same character as the ring 196 shown in FIG. 7B. Because the workpiece material can only flow outwardly, a single shoulder 208 or 210 is formed on each blank. The final components are two, mirror image, shouldered or L-sectioned rings.

The actual simultaneous forming of two shouldered rings as just described is shown in FIG. 2. The inset in the figure contains photographs of the cross sections of the two, simultaneously formed, shouldered rings.

The technique shown in FIG. 7D involves lateral spreading of the metal in a circular blank 214 like those identified above as 196, 204, and 206 into a ring with a cruciform section, the metal in the central portion of the section flowing laterally to form longitudinally extending legs 216 and 218 integral with inwardly and outwardly extending radial legs 220 and 184. In the process shown in this figure essentially the entire cross section of blank 214 is heated to a temperature at which it becomes plastic. Consequently, the section is not self-supporting during the forming operation; and an external guidance system such as that described briefly above is provided to keep the weight of the workpiece from causing an unwanted change in configuration as the component is formed.

Taken together, FIGS. 7A-7D clearly show the high degree of versatility our novel radial rolling processes possess. Blanks of different types are converted singly and simultaneously into rings having as few as two and as many as four legs using the same machine and only one change of forming electrode. Further versatility is evidenced by FIG. 7E. The exemplary forming operation shown in that figure differs from those so far described in that the blank 224 being formed is made by rolling or bending strip or sheet stock in the "easy" direction (i.e., in the direction of the minor cross-sectional dimension) into a circle and welding the ends of the strips together.

In the forming operation of FIG. 7E the workpiece material flows into contact with the sculpted external surface 226 of electrode 186 to impart the wanted surface configuration to one side of the component being formed. Depending upon whether the workpiece encircles the flat upper electrode 74 or the sculpted lower electrode, the illustrated configuration can be imparted to either the inner or outer face of the ring-shaped final component.

Because the entire cross section of the workpiece is heated, an external guidance or support system is required.

The technique shown in FIG. 7E can of course also be applied to rings rolled in the hard direction.

The foregoing were all examples of radial rolling; i.e., forming with the squeeze force of the electrodes exerted in the radial direction. In face rolling, the second type of process for forming ring-shaped components we have invented, the pressure applying electrode is biased in a direction parallel to the axis of symmetry about which the workpiece is rotated, the squeeze force thereby acting generally at a right angle to the workpiece radius.

Figure 8:
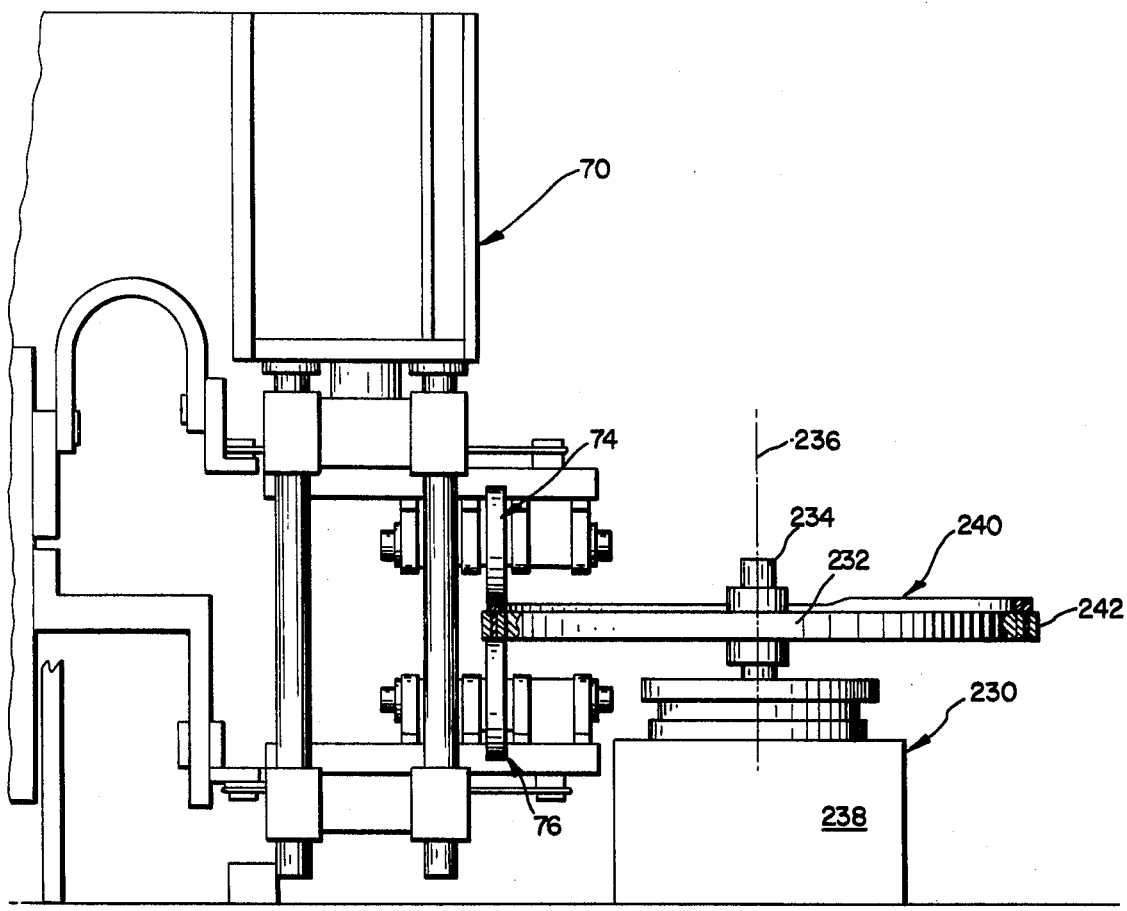
FIG. 8 is a view similar to FIG. 3 with the apparatus depicted in the latter equipped with a rotating mandrel unit for face rolling.

For face rolling a unit 230 with a horizontally rotatable table or mandrel 232 as shown in FIG. 8 or a unit with an equivalent function is employed in association with forming machine 70.

Mandrel 232 is fixed to and rotated by shaft 234 about a vertical axis 236 which lies in the same vertical plane as the rotation axes of electrodes 74 and 76. Shaft 234 is driven by a motor (not shown) housed in stand 238 of unit 230.

Mandrel 232, which also functions as tooling as will become apparent hereinafter, will typically be composed of plural, curvilinear sections of refractory metal barstock (0.5 by two inch molybdenum barstock has been successfully employed). Plural members rather than a single ring are preferred as this minimizes tooling costs and facilitates assembly and disassembly of the tooling and the blank and formed component.

Blanks for face rolling are most often rings formed from bar or strip stock rolled into a ring in the easy direction. Blanks bent in the hard direction from straight stock can, however, be employed if the occasion demands.

The circular workpiece or blank (240 in FIG. 8) is confined between mandrel 232 and outer, curvilinear, refractory metal tooling members 242 typically bolted through the blank to the mandrel at intervals therearound. As shown in FIG. 8, the axis of symmetry (and rotation) of the workpiece 240 is so spaced from machine 70 that, as the workpiece is rotated, it is translated between electrodes 74 and 76 of machine 70 to effect an isothermal forming of the workpiece into the configuration wanted in the final, ring-shaped component using localized heating and pressure as described above.

Figures 9A, 9B:
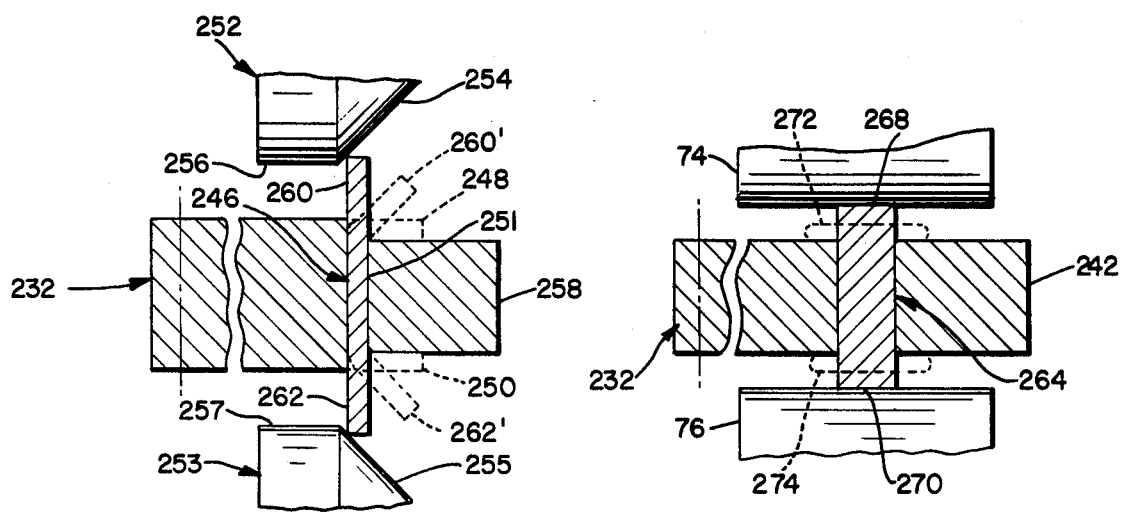
FIGs. 9A and 9B depict exemplary face rolling processes embodying the principles of the present invention.

Exemplary face rolling techniques which the apparatus shown in FIG. 8 is capable of carrying out are shown in FIGS. 9A and 9B. More particularly, FIG. 9A depicts the square bending of a sheet or plate stock bank 246 to produce a channel-sectioned ring with radially, outwardly extending flanges 248 and 250 at opposite ends of a longitudinally extending, cylindrical leg or flange 251 defined by that part of the blank confined between the mandrel or inner tooling 232 and the outer tooling 242.

For this operation, the flat-faced electrodes 74 and 76 shown in FIG. 8 are preferably replaced with electrodes 252 and 253 having bevelled face portions 254 and 255 and flat face portions 256 and 257; and outer tooling members 258 which are not as deep as mandrel 232 or the tooling members 242 shown in FIG. 8 are employed to accommodate flanges 248 and 250. Also, mild steel is satisfactory for tooling in square bending processes and can be used in place of refractory tooling to reduce tooling costs, if desired.

As in the exemplary processes described previously, forming is accomplished by heating the workpiece and applying pressure to it via electrodes 252 and 253 as the workpiece is moved relative to the electrodes by the rotation of mandrel 232. This results in the unsupported leg portions 260 and 262 of the workpiece being bent through 90 degree angles to form flanges 248 and 250, a goal typically reached in two passes.

In the first pass the bevelled face portions of the electrodes are used as shown in FIG. 9A to displace the unsupported portions of the blank to the dotted line positions identified by reference characters 260' and 262'. In the second pass the electrodes are shifted to the right as shown in FIG. 9A, and the flat face portions 256 and 257 of the electrodes iron the unsupported workpiece portions 260 and 262 onto tooling member 258 to complete the formation of the flanges.

Also, particularly in the second pass, the workpiece metal flows into contact with the inner corners of the tooling members or mandrel 232 and against the shoulders between mandrel 232 and outer tooling members 258, producing contours dictated by the shape of the tooling at the inside of each bend and a near zero radius on the outside of the bend. For the reasons discussed in detail in parent application no. 553,998, this controlled, small-to-zero radius formation of contours on both the inside and outside of the bend results in components of superior quality.

FIG. 9B shows how the FIG. 8 set-up can be used to form an I-sectioned ring. That ring can subsequently be split into two T-sectioned rings, if desired.

Again, a rectangularly sectioned blank 264 formed from strip bent in the easy direction is confined between a circular mandrel and curvilinear outer tooling members. The mandrel and tooling members may be identical to those shown in FIG. 8, and they are accordingly identified by the same reference characters.

In the forming operation of FIG. 9B the two flat-faced electrodes 74 and 76 are employed. They spread the unsupported portions 268 and 270 of the workpiece laterally to form radial legs or flanges 272 and 274 at opposite ends of a longitudinal leg or flange defined by that part 264 of the workpiece confined between mandrel 232 and tooling members 242. Also, the workpiece material is caused to flow into contact with the mandrel and outer tooling to provide controlled contours between the flanges and the web of the formed section.

As in the case of radial rolling, we have above described only exemplary face rolling techniques. As examples of other face rolling techniques, T-sectioned as well as channel-sectioned rings can be formed by square bending as can both leg in and leg out rings and rings with both in and out legs; and right angles need not necessarily be formed.

Also, in face rolling, two components can simultaneously be formed; and sculpted tooling and/or electrodes and/or a sculpted mandrel maybe used to impart a wide variety of surface configurations to the component being formed.

As will be apparent to those skilled in the relevant arts from the foregoing text, there are inumerable applications and adaptations of the principles of our invention of which advantage can on occasion be taken. For example, rolling can be interrupted or otherwise so carried out that different segments of the final component will have different cross-sectional configurations.

Also, certain features of our invention such as integral tooling can be used in making components which are not rings by isothermal metalworking. To the extent that these and other embodiments, adaptations, and applications of our invention have not been expressly excluded from the appended claims, they are fully intended to be embraced therein. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Apparatus for the solid state forming of a metallic workpiece into a component of selected configuration, comprising: a rotatable, pressure applying electrode fabricated of a refractory metal or a refractory alloy; means disposed in spaced relation to said electrode for supporting the workpiece; means supporting said electrode for movement toward and away from said workpiece supporting means; means operable to so bias said electrode toward said workpiece supporting means that it exerts a force of selected magnitude on said workpiece; means for so heating both said workpiece in that region thereof between the pressure applying electrode and the workpiece supporting means and that portion of the electrode contiguous to the workpiece and for impeding the flow of heat away from said electrode to keep said electrode as from chilling said workpiece comprising means for connecting the workpiece across an electrical power source through the pressure applying electrode and the workpiece supporting means; means for so regulating the current density through the workpiece and the force exerted on it by the rotatable pressure applying electrode as to maintain the temperature of said workpiece below its melting point but sufficiently high to produce in the heated region between the pressure applying electrode and the workpiece supporting means a localized zone in which the workpiece is in a plastic and flowable condition; and means for displacing the workpiece about its axis of symmetry to thereby translate said workpiece relative to said electrode and cause the zone in which the plastic condition exists to progress along the workpiece.

2. A method for the solid state forming of a metallic workpiece into a component of selected configuration with apparatus which includes an electrode means for supporting the workpiece, a rotatable pressure applying electrode of a refractory metal or a refractory alloy adapted to engage the workpiece on the side thereof opposite the workpiece supporting electrode means, and means by which said rotatable electrode can be so biased toward said workpiece supporting electrode means as to exert a pressure of a predetermined magnitude on said workpiece, said method comprising the steps of: so heating both said workpiece in that region thereof between the pressure applying, rotatable electrode and the workpiece supporting electrode means and that portion of the rotatable electrode adjacent the workpiece that the electrode will not chill the workpiece by connecting the workpiece across an electrical power source through the pressure applying electrode and the workpiece supporting electrode means; so regulating the current density through the workpiece being formed and the force exerted on it by the pressure applying electrode as to maintain the temperature of said workpiece below its melting point but sufficiently high to produce in the heated region of the workpiece between the pressure applying electrode and the workpiece supporting electrode means a localized zone in which the workpiece is in a plastic and flowable condition; and displacing said workpiece about its axis of symmetry to thereby translate the workpiece relative to said rotatable electrode and cause the zone in which the plastic condition exists to progress along the workpiece.

3. A method for the solid state forming of a ring-shaped metallic workpiece into a component of selected cross-sectional configuration with apparatus which includes first and second rotatable electrodes of a refractory metal or a refractory alloy engageable with said workpiece and means for so biasing one of said electrodes against said workpiece as to exert a force or pressure of selected magnitude thereon while the workpiece is supported by the other of said electrodes, said method comprising the steps of: so heating both said workpiece in that region thereof between the pressure applying, rotatable electrode and the workpiece supporting electrode and that portion of the rotatable electrode adjacent the workpiece that the electrode will not chill the workpiece by connecting the workpiece across an electrical power source through the pressure applying electrode and the workpiece supporting electrode; so regulating the current density through the workpiece being formed and the force exerted on it by the pressure applying electrode as to maintain the temperature of said workpiece below its melting point but sufficiently high to produce in the heated region of the workpiece between the pressure applying electrode and the workpiece supporting electrode a localized zone in which the workpiece is in a plastic and flowable condition; and displacing said workpiece about its axis of symmetry to translate the workpiece relative to the electrodes and thereby cause said localized zone to proceed along the workpiece.

4. Apparatus as claimed in claim 1 wherein the means for displacing the workpiece about its axis of symmetry comprises the workpiece supporting means, said workpiece supporting means being mounted for rotation about an axis oriented at right angles to and lying in the same plane as the axes of rotation of the pressure applying electrode.

5. Apparatus as claimed in claim 4, together with tooling supported from said workpiece supporting means and rotatable with the workpiece for imparting to said workpiece as it is formed at least part of the cross-sectional configuration wanted in the component into which the workpiece is formed.

6. Apparatus as claimed in claim 5, wherein said tooling comprises members engaging both the inner and outer surfaces of said workpiece, one of said members protruding beyond the other toward the pressure applying electrode and an unsupported portion of the workpiece protruding theretoward beyond both of said tooling members whereby, as said pressure applying electrode exerts pressure on the workpiece, said electrode will bend the unsupported portion of the workpiece into contact with said other of said tooling members to form a component with two angularly disposed portions and the material in the heated portion of the workpiece will flow into contact with said other tooling member to produce a bend of controlled contour.

7. Apparatus as claimed in claim 1, which comprises a frame and means mounting said pressure applying electrode and the workpiece supporting means in cantilever fashion from and beyond said frame for rotation about generally horizontal axes to thereby accommodate a vertically oriented workpiece.

8. Apparatus as claimed in claim 1, together with force feeding means including drive rolls engageable with the workpiece ahead of the pressure applying electrode for imparting to the workpiece a force acting in the direction of workpiece movement.

9. Apparatus as claimed in claim 1, wherein at least one of said electrodes is composed of segments adapted to receive a portion of the workpiece therebetween.

10. Apparatus for forming a metallic workpiece into a component of selected cross-sectional configuration, comprising: a frame; a first, rotatable, pressure applying electrode fabricated of a refractory metal or a refractory alloy; a second, rotatable electrode supported from said frame, said second electrode being fabricated of a refractory metal or a refractory alloy; means supporting the first electrode from said frame for movement toward and away from the second electrode; means operable to so bias said first rotatable electrode toward said second rotatable electrode as to cause said first electrode to exert a pressure of predetermined magnitude on a workpiece disposed between said electrodes; means for heating that portion of the workpiece between the first and second electrodes and that portion of the first electrode contiguous to the workpiece and for impeding the flow of heat away from said heated portion of said first electrode to keep said electrode from chilling said workpiece including means for connecting the workpiece across an electrical power source through said first and second electrodes; means for so regulating the current density through the workpiece and the pressure exerted on the workpiece by the first electrode as to maintain the temperature of the workpiece below the solidus temperature of the workpiece between the first and second electrodes a localized zone in which the workpiece is in a plastic and flowable condition; means for displacing the workpiece relative to said electrodes to thereby cause the zone in which the plastic condition exists to progress along the workpiece; and means by virtue of which said electrodes can be shifted relative to the frame of the apparatus, thereby making said apparatus capable of accommodating workpieces of different sizes and/or configurations.

11. A method as claimed in claim 2, wherein the current density through the workpiece is regulated by way of the workpiece temperature in a location proximate to that at which the workpiece is engaged by the pressure applying electrode.

12. A method as claimed in claim 2, together which the step of exerting on said workpiece ahead of the rotatable, pressure applying electrode a compressive force acting in the direction of workpiece movement.

13. A method as claimed in claim 2, further including the steps of: rotating said workpiece and tooling means assembled thereadjacent about the axis of symmetry of the workpiece; confining one leg forming portion of the workpiece adjacent said tooling means with second leg portion of the workpiece unsupported and protruding beyond the tooling means in the direction of the pressure applying electrode and so engaging said pressure applying electrode with said workpiece that, as said workpiece is translated relative to said electrode, the pressure applying electrode will bend the unsupported portion of the workpiece into contact with said tooling member, the plastic workpiece material in said localized zone flowing into contact with said tooling means to provide a controlled contour at the juncture between the leg portions of said workpiece.

14. A method as claimed in claim 2, wherein said apparatus also includes a mandrel for rotating said workpiece about its axis of symmetry and curvilinear tooling means rotatable with said mandrel and said method includes the steps of: confining said workpiece between said mandrel and said tooling means with a portion of the workpiece protruding beyond said tooling means in the direction toward said pressure applying electrode whereby, as said workpiece is translated relative to said electrode, the workpiece material in the localized zone will flow into contact with the tooling means and/or the mandrel to impart to the workpiece a configuration wanted in the component being formed.

15. A method as claimed in claim 3, wherein the workpiece is rotated by rotating said workpiece supporting electrode means.

16. A method as claimed in claim 3, wherein one of said electrodes is composed of two electrode members adapted to receive said workpiece therebetween and said method includes the steps of: feeding said workpiece between said electrodes with a portion of the workpiece moving between the members of said one electrode and so engaging the other of said electrodes with said workpiece as to effect a lateral flow of the workpiece material in that zone thereof in which the material is in a plastic condition.

17. A method as claimed in claim 16, wherein the workpiece encircles the said one of said electrodes, whereby the component into which the workpiece is formed will have a radially inwardly extending flange.

18. A method as claimed in claim 16, wherein the workpiece encircles said other of said electrodes whereby the component into which the workpiece is formed will have a radially outwardly extending flange.

19. A method as claimed in claim 16, wherein said other of said electrodes is also composed of two members as aforesaid whereby the component into which the workpiece is formed will have at least one laterally extending leg and inwardly and outwardly extending radial legs.

20. A method for the solid state forming of a metallic workpiece into a component of selected cross-sectional configuration with apparatus which includes first and second rotatable electrodes of a refractory metal or a refractory alloy engageable with said workpiece and means for so biasing one of said electrodes against said workpiece as to exert a force or pressure of selected magnitude thereon while the workpiece is supported by the other of said electrodes, said method comprising the steps of: so heating both said workpiece in that region thereof between the pressure applying, rotatable electrode and the workpiece supporting electrode and that portion of the rotatable electrode adjacent the workpiece that the electrode will not chill the workpiece by connecting the workpiece across an electrical power source through the pressure applying electrode and the workpiece supporting electrode; so regulating the current density through the workpiece being formed and the force exerted on it by the pressure applying electrode as to maintain the temperature of said workpiece below its melting point but sufficiently high to produce throughout a first portion of the section of said workpiece a localized zone in which the workpiece is in a plastic and flowable condition while maintaining the material in a second, cold zone portion of the section sufficiently cool as to not exceed the yield strength of the material, whereby the material in said last-mentioned portion of the section will function as integral tooling as the metal in said localized zone flows into the configuration wanted in the component being formed; and translating said workpiece relative to said pressure applying electrode to cause said localized zone to proceed along said workpiece.

* * * * *

UNITED STATES PATENT OFFICE
CERTIFICATE OF CORRECTION

Patent No. 4,150,279　　　　　Dated April 17, 1979

Inventor(s) Arthur G. Metcalfe and Fred K. Rose

It is certified that error appears in the above-identified patent and that said Letters Patent are hereby corrected as shown below:

Column 4, line 19, change "edtes" to --edges--.
Column 8, line 33, change "foundatin" to --foundation--.
Column 10, line 54, change "0.1.6" to --0.106--.
Column 11, line 51, change "techinuqes" to --techniques--.
Column 11, line 66, change "accomodates" to --accommodates--.
Column 13, line 10, after "hard" insert --direction (i.e., in the direction of the major cross-sectional--.
Column 14, line 54, change "bank" to --blank--.
Column 16, Claim 1, line 31, after "said" insert --heated portion of said--.

Column 18, Claim 10, line 37, after "workpiece" insert --material but high enough to produce in that portion of the workpiece--.
Column 18, Claim 12, line 52, change "which" to --with--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,150,279
DATED : April 17, 1979
INVENTOR(S) : Arthur G. Metcalfe and Fred K. Rose It is certified that error appears in the above-identified patent and that said Letters Patent are hereby corrected as shown below:

Column 16, Claim 1, line 31, after "electrode" insert --as--.

Column 16, Claim 1, line 32, after "electrode" delete --as--.

Signed and Sealed this

Eighth Day of January 1980

[SEAL]

Attest:

SIDNEY A. DIAMOND

Attesting Officer

Commissioner of Patents and Trademarks